July 1, 1930.　　J. S. OECHSLE　　1,769,158
COUPLING
Filed Aug. 24, 1927　　2 Sheets-Sheet 1

Inventor
JOSEPH S. OECHSLE
By Leon Edelson
　　Attorney.

July 1, 1930.  J. S. OECHSLE  1,769,158
COUPLING
Filed Aug. 24, 1927    2 Sheets-Sheet 2

Inventor
JOSEPH S. OECHSLE
By *Sam Edelson*
Attorney.

Patented July 1, 1930

1,769,158

UNITED STATES PATENT OFFICE

JOSEPH S. OECHSLE, OF PHILADELPHIA, PENNSYLVANIA, ASSIGNOR TO METALWELD SERVICE CORPORATION, OF PHILADELPHIA, PENNSYLVANIA, A CORPORATION OF PENNSYLVANIA

COUPLING

Application filed August 24, 1927. Serial No. 215,147.

This invention relates generally to improvements in couplings between rotary shafts.

One of the principal objects of this invention is to provide a coupling or connection between the adjacent ends of a pair of normally aligned shafts which is so constructed as to permit axial misalignment within certain limits of one of the shafts with respect to the other thereof.

A further object of the invention is the provision of a coupling between rotary shafts wherein a maximum of interengaging surfaces between said shafts is had for preventing relative rotation therebetween, the interengaging surfaces being so arranged, however, as to provide for longitudinal adjustment of said shafts toward and away from each other.

A still further object of the invention is the provision of a closed lubricant receiving chamber within which are arranged the interengaging elements of the coupling.

A still further object of the invention is the provision, in connection with a lubricant chamber in which the coupling members are housed, of means in one of said members for insuring the necessary lubrication of every portion of the interengaging surfaces of said members.

A still further object of the invention is the provision of an improved coupling which is simple in construction, inexpensive in manufacture, easily installed and efficient in operation.

Further objects, and objects relating to details of construction and assembly will appear more fully hereinafter.

The invention consists substantially in the construction combination, location and relative arrangement of parts, all as will be explained more fully hereinafter, and finally pointed out in the appended claims. In the accompanying drawings, there have been shown for purposes of illustration two forms of the invention, it being understood, of course, that the invention may assume other forms without departing from the spirit or principles thereof.

Figure 2:
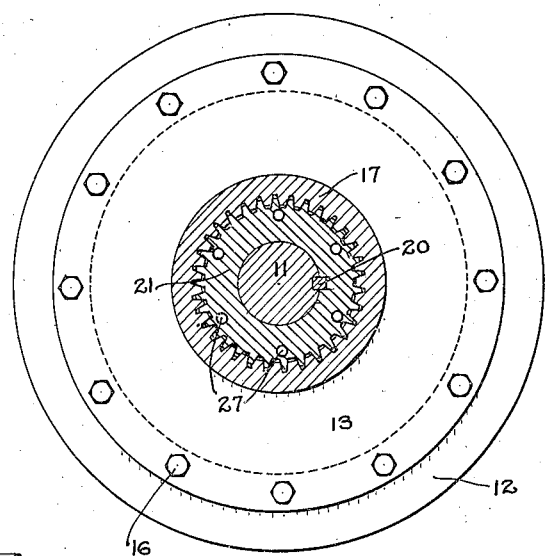
Figure 2 is a view taken on the line 2—2 of Figure 1.
Figure 1:
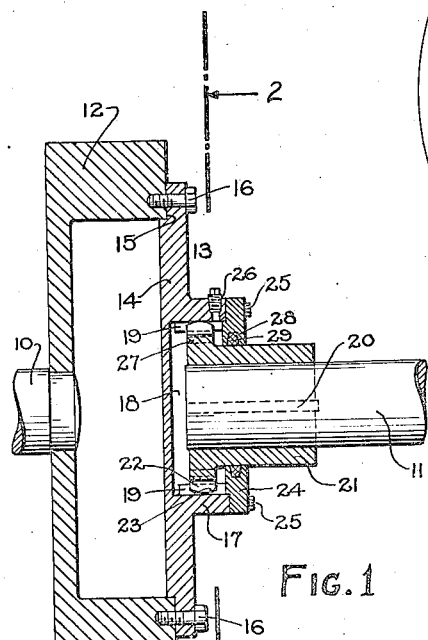
Figure 1 is a vertical longitudinal section through one form of coupling embodying the principles of the invention.
Figure 3:
Figure 3 is a rear view of the outer coupling member shown in Figure 1.
Figure 3:
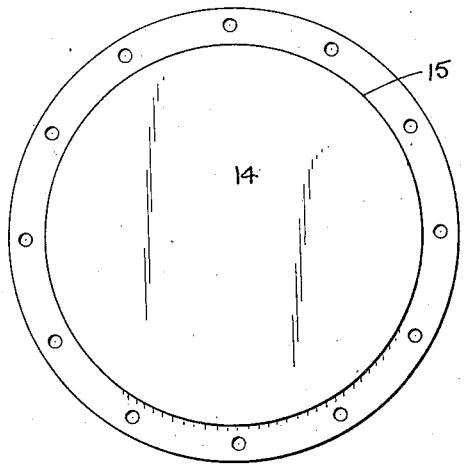

Referring to the drawings and more particularly to Figures 1, 2 and 3, it will be seen that for illustrative purposes there has been shown a driving shaft 10 arranged to be connected to a driven shaft 11, the driving shaft being keyed or otherwise non-rotatably secured to a fly-wheel 12 of more or less usual construction. The driving connection between the said driving shafts is effected through a coupling embodying the principles of this invention, one member 13 of which is in the form of a substantially flat circular plate 14, the forward face of which is provided with an annular shoulder 15 arranged to properly center said member against the fly-wheel 12. Bolts 16 serve to rigidly and non-rotatably secure the coupling member 13 to the fly-wheel. Projecting rearwardly from the plate 14 and coaxial with the central axis thereof is an annular flange 17 providing a chamber 18, the inner wall of which is preferably of greater depth than the outer wall thereof. Formed on said annular flange 17 is an internal ring gear 19, the teeth of which are straight from edge to edge and of a width substantially equal to the depth of the chamber 18.

Keyed to the end of the driven shaft 11, as by the key 20, is a sleeve 21 upon one end of which is formed an external ring gear 22, the teeth of which are adapted to mesh with the teeth of the internal gear 19. It will be noted that the external gear teeth are of substantially less width than the internal gear teeth, the arrangement being such as to permit longitudinal adjustment being had between the internal and external gears. The external gear teeth differ in still another respect from those of the internal gear 19 in that the former are curved from edge to edge, or crowned, as is best shown at 23 in Figure 1. By so crowning the teeth of the external gear 19, a rocking action is obtained between the main coupling members 13 and 21 with the result that misalignment of the shafts 10 and 11, which are respectively secured to said members, is permitted within certain limits.

Arranged to be slipped over the member 21 is the rear cover plate 24 for the chamber 18, this plate 24 being bolted, as at 25, to the outer edge of the annular flange 17. It will be observed that the chamber 18, within which are located both the external gear 19 and the internal gear 22, is provided at any suitable point with a plugged opening 26 through which the chamber may be filled with lubricant for reducing frictional wear between the interengaging teeth. In order to insure proper and equal distribution of lubricant over every portion of the meshed gears the external gear 23 is provided with a plurality of circumferentially spaced openings 27 through which the lubricant may freely pass from one side of the lubricant chamber to the other.

Preferably, the inner edge of the cover plate 24 is provided with an annular groove 28 therein for receiving a packing 29 which latter not only forms a dust-proof joint with the cylindrical surface of the coupling member 21 but also prevents any of the lubricant from passing out of the chamber 18. It will be understood, of course, that the internal diameter of the cover plate 24 is slightly greater than that of the member 21 in order to permit the above-mentioned rocking action between the coupling members to take place.

Figure 5:
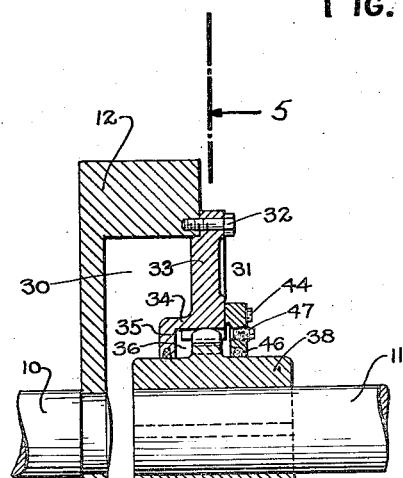
Figure 5 is a view taken on the line 5—5 of Figure 4.
Figure 4:
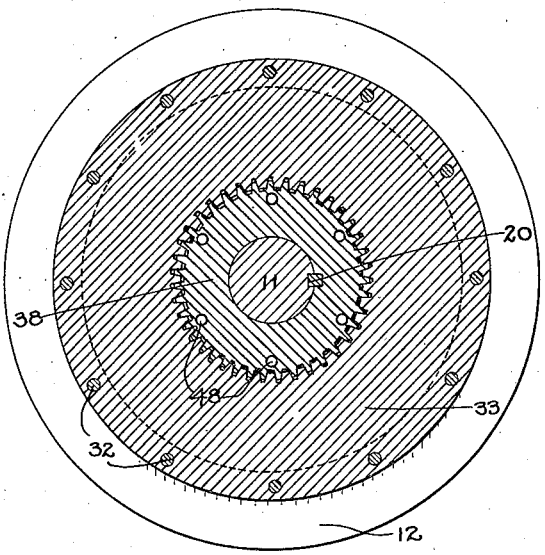
Figure 4 is a vertical longitudinal section of a modified form of coupling.
Figure 4:
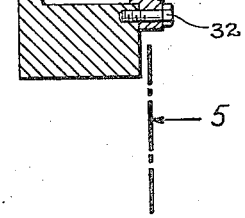
Figure 6:
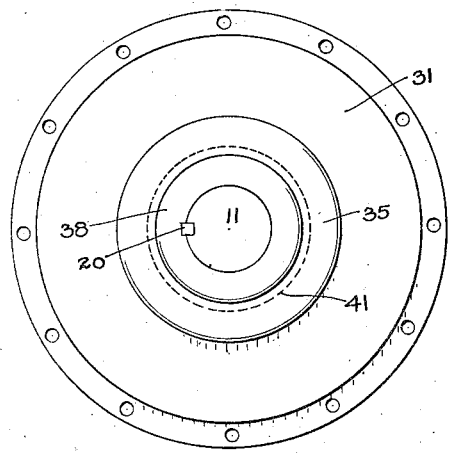
Figure 6 is a rear view of the outer coupling member shown in Figure 4.

Figures 4, 5 and 6 show a modified form of construction wherein advantage is taken of the recess 30 in the fly-wheel 12 for partially housing the coupling, thereby permitting the end of the driven shaft 11 to be brought closer to the driving shaft 10. The coupling member 31 is secured to the fly-wheel 12 by bolts 32 in exactly the same manner as is the member 13 shown in Figure 1. The main body or web 33 of this coupling member 31 is provided with a forwardly projecting annular flange 34 and a radially extending flange 35, both of which flanges are formed integrally with said web and are coaxial with the central axis thereof to provide a central chamber 36. As in the case of the construction previously described, an internal ring gear 37 is arranged on the annular wall of said chamber, the teeth of which are straight from edge to edge and are of a width substantially equal to the depth of said chamber.

Keyed to the end of the driven shaft 11 is a sleeve 38 upon which is arranged an external ring gear 39, the teeth of which are crowned, as at 40, and are of substantially less width than the teeth of the internal gear 37. This external gear 39 is disposed intermediately of the ends of the sleeve 38 so that upon its being meshed with the internal gear 37 the sleeve 38 projects through the radial flange 35 of the coupling member 31 and into the recess 30 of the fly-wheel 12. Preferably this radial flange 35 is provided with an annular groove 41 within which is received a packing 42 constituting a seal at the forward end of the chamber 36. The rear end of this chamber is closed by a cover plate 43 which is arranged to be slipped over the sleeve 38 and bolted, as at 44, to the web of the coupling member 31. This cover plate 43 is also provided with an annular groove 45 within which is received a packing 46 constituting a seal at the rear end of the chamber 36. Lubricant is supplied to this chamber by way of a plugged opening 47 in the cover plate. In order to insure proper lubrication of every portion of the interengaging teeth the external gear 39 is provided with a plurality of circumferentially spaced openings 48 extending through the web of the gear and through which the lubricant may pass freely from one side of the lubricant chamber to the other.

It is to be understood that in both forms of construction herein described the interengaging teeth of the meshing gears are provided with sufficient clearance to permit the desired rocking action to take place between the coupling members at the same time that they provide a maximum of interlocking surfaces therebetween. Further, the arrangement described insures a positive lubrication being had at all times of every portion of the relatively moving parts thereby preventing any excessive wear thereof. Still further, the arrangement permits the shafts to be adjusted longitudinally of each other with great ease and facility at the same time that it allows for misalignment between said shafts during operation.

It is to be understood, of course, that the invention may take other forms than those hereinbefore described without involving any departure from the real spirit or principles of the invention and it is accordingly intended to claim the invention broadly, as well as specifically, as indicated in the appended claims.

What is claimed as new and useful is:

1. In a flexible coupling between a driven shaft and a driving shaft having a flywheel centrally recessed to provide a substantially annular rim, in combination, a coupling member having a plane marginal portion arranged to be secured to the rear face of said rim and a central portion spaced axially from the body of said flywheel, said central portion being provided with a rearwardly opening chamber, a second coupling member secured to the driven shaft and arranged to be telescopically received within said chamber, and cooperating means on each of said coupling members for affording direct engagement therebetween.

2. In a flexible coupling between a driven shaft and a driving shaft having a centrally recessed flywheel, in combination, a coupling member extending across and closing the open end of said flywheel recess and arranged to be detachably secured to the rear face of the rim flange thereof, an annular flange on said coupling member forming a rearwardly presenting self-contained lubricant receiving chamber, said chamber being independent of and spaced axially from the web of said flywheel, a second coupling member secured to the driven member and arranged to be telescopically received within said chamber, and cooperating engaging means respectively formed on said coupling members and operable to permit said first mentioned coupling member to be disconnected from said flywheel without disorganizing said self-contained lubricant receiving chamber.

3. In a flexible coupling between a driven shaft and a driving shaft having a centrally recessed flywheel, in combination, a coupling member axially spaced from the main body of and overlying the recess in said flywheel, a central annular flange on said coupling member coaxial with said driving shaft, an internal gear on said flange, a second coupling member having an external gear arranged for meshing engagement with said internal gear, the teeth of said external gear being crowned and of substantially less width than those of said internal gear, means on said annular flange cooperating with said second coupling member to form a substantially sealed chamber within which said gears are housed and securing elements arranged exteriorly of said chamber for detachably securing said first coupling member to said flywheel, said gears being axially adjustable and said chamber being shiftable away from said flywheel when said elements are removed.

4. In a quick-detachable flexible coupling between a driven shaft and a driving shaft having a recessed flywheel, in combination, a pair of coupling members respectively secured to said driven shaft and to said flywheel, one of said members having an annular flange spaced axially from the body of and projecting exteriorly of the recess in said flywheel, internal gear teeth on said flange extending substantially from the edge to edge thereof, external gear teeth on the other member and of a width substantially less than the width of said internal teeth, said internal and external teeth being arranged for meshing engagement, and means at opposite ends of said flange to form with the latter a substantially unitary closed lubricant receiving chamber within which said teeth are housed, said chamber being formed independently of said flywheel.

5. In a quick-detachable flexible coupling between a driven shaft and a driving shaft having a flywheel, in combination, a pair of coupling members interposed between said shafts and provided with directly engaging internal and external surfaces, axially spaced means provided on one of said members and cooperating with the other to form a self-contained sealed lubricant-receiving chamber within which said surfaces and a lubricant therefor are sealed, and means arranged exteriorly of said chamber for securing one of said members to said flywheel, said chamber being shiftable axially of said shafts without disrupting the sealed condition thereof.

6. In a flexible coupling between a driven shaft and a driving shaft having a flywheel, in combination, a pair of coupling members interposed between said shafts and provided with cooperating engaging surfaces, axially spaced means provided on one of said members and cooperating with the other to form a sealed lubricant receiving chamber within which said engaging surfaces and a lubricant therefor are enclosed, means arranged exteriorly of said chamber for securing one of said members to said flywheel, and means for permitting said closed lubricant chamber to be shifted as a unitary assembly axially away from said flywheel when said securing means are removed, said chamber being shiftable without the escape of lubricant therefrom.

7. In a quick-detachable flexible coupling between a driven shaft and a driving shaft having a flywheel, in combination, a pair of coupling members interposed between said shafts and respectively provided with directly engaging sets of internal and external teeth, the teeth of one set being of considerably less width than those of the other, means cooperatively associated with said members to form a closed lubricant receiving chamber within which said sets of teeth and a lubricant therefor are sealed, said chamber being in the form of a unitary assembly independent of said flywheel and of a fixed depth substantially equal to the width of the wider set of teeth, and means arranged exteriorly of said chamber for detachably securing one of said members to said flywheel with said chamber in axially spaced relation with respect thereto.

8. In a quick-detachable flexible coupling between a driven shaft and a driving shaft having a flywheel, in combination, a pair of coupling members interposed between said shafts and respectively provided with internal and external gear teeth, axially spaced means on said internal gear member arranged to cooperate with said external gear member to form a completely sealed lubricant receiving chamber within which said gear teeth are enclosed, the web of said external gear member being provided with transversely extending openings, means arranged exteriorly of said chamber for detachably securing said internal gear member to said flywheel with said chamber in axially spaced relation with respect thereto, and means operative when said securing means are removed to permit said chamber as a unitary assembly to be shifted axially away from said flywheel without effecting the disengagement of said internal and external teeth and without disrupting the sealed condition of said chamber.

9. In combination, a driven shaft, an external gear secured to said driven shaft, an annular housing embracing said external gear and including an internal gear for meshing engagement therewith, means operatively associated with said housing to define a unitary closed lubricant receiving chamber within which said gears and a lubricant therefor are sealed, a drive shaft having a flywheel secured thereto, and means for permitting said housing to be secured to or removed from said flywheel without disrupting said unitary lubricant receiving chamber and so permitting the escape of lubricant therefrom.

10. In combination, a driving shaft and a driven shaft capable of slight relative axial movement, an external gear mounted on the driven shaft, a sealed housing formed independently of the driving shaft and enclosing the external gear and including an internal gear in mesh with said external gear, said internal gear being wider than said external gear whereby the housing may be moved axially of the driven shaft to effect clearance between the housing and the driving shaft, said housing being movable axially away from said driving shaft without permitting the escape of lubricant therefrom and means for detachably connecting the housing and the driving shaft without disrupting the sealed condition of said housing.

In testimony whereof, I have hereunto affixed my signature.

JOSEPH S. OECHSLE.